Patented Feb. 9, 1954

2,668,766

UNITED STATES PATENT OFFICE 2,668,766
PROTEIN ADHESIVES

Arthur C. Beckel, Peoria, and Paul A. Belter, Pekin, Ill., assignors to the United States of America as represented by the Secretary of Agriculture No Drawing. Application December 31, 1948, Serial No. 68,442

1 Claim. (Cl. 99—81)

(Granted under Title 35, U. S. Code (1952), sec. 266)

This application is made under the act of March 3, 1883, as amended by the act of April 30, 1928, and the invention herein described, if patented in any country, may be manufactured and used by or for the Government of the United States of America for governmental purposes throughout the world without the payment to us of any royalty thereon.

This invention relates to protein adhesives and, in particular, to adhesive compositions comprising the alcohol-extracted proteinaceous soybean residue. The object of the invention is to utilize soybean residue as an adhesive.

In application Serial No. 782,941, filed October 29, 1947, of Letta I. De Voss, Arthur C. Beckel, and Paul A. Belter, now Patent No. 2,495,706, there is disclosed a process of preparing an irreversible vegetable gel.

According to this process of DeVoss et al., an alcohol-extracted proteinaceous soybean residue, which is substantially devoid of alcohol-soluble matter, is prepared by treating a proteinaceous soybean material, which may be either flakes, ground soybeans, or soybeans comminuted in any other fashion, to remove the oil, such as by conventional procedures like extraction with petroleum ether, hexane, or other similar solvents. The resulting oil-free proteinaceous soybean material is then thoroughly contacted with alcohol, preferably ethyl alcohol, in a concentration of about from 50 percent to absolute alcohol, such as by washing, to remove alcohol-soluble matter.

A second method involves treating the soybean material, in any of the forms listed above, although preferably as flakes, with alcohol directly to extract the oil and any other alcohol-soluble matter present. A second alcohol washing is therefore unnecessary.

In both the above procedures, the use of alcohol has the effect of removing certain constituents, among which are those which act as antigelling factors, and which heretofore have prevented the formation of gels from proteinaceous soybean material.

Thereafter, the alcohol-extracted proteinaceous soybean residue, now substantially devoid of alcohol-soluble matter, is extracted with water to obtain a mixture of a proteinaceous material suspended in an aqueous solution of water-soluble constituents, this mixture containing at least about 10 percent solids, that is, at least about 5 percent proteinaceous matter. This mixture is allowed to stand for a period of about from one-half to one hour, after which the insoluble fibrous material is separated from the aqueous phase as by filtration or other conventional procedure.

The remaining aqueous phase, which contains at least about 10 percent solids, may be evaporated, if desired, by conventional means, preferably by spray-drying, to produce a dry, solid, powdery gelling material. The aqueous phase itself, if it contains at least 10 percent solid, and preferably should contain from 10 to 50 percent solids, or a similar water suspension of the dried product, will form the irreversible gel upon being heated at a temperature ranging from about 150° F. to boiling and at a pH ranging from about 5.0 to 9.0.

We have discovered that aqueous suspensions of these types, which contain about from 10 to 70 percent solids, when spread on a solid material, such as paper, wood, fabrics, and the like, and dried, are capable of forming a strong adhesive bond. Accordingly, therefore, the invention provides a solid material having as a bonding agent therefor a coating comprising essentially the water-extractable component of alcohol-extracted proteinaceous soybean residue, the said component containing, in addition to protein constituents, such other water-solubles as carbohydrates, albumins, proteoses and the like. Examples of such materials are paper coated with this agent, e. g. pregummed paper, pieces of paper bonded together with this agent, e. g. laminated paper, materials bonded together to form aggregates, e. g. cork granules, popcorn balls, candy, and so forth. The bonding agent may also contain other materials, such as starch, proteins, formaldehyde, dextrins, and resins to form modified remoistening and heat energizable adhesive compositions. Flavorings or perfumes may also be admixed with the coating composition and any desirable filler or plasticizer may be used with it.

The adhesive materials of this invention have two unique and important features. The dry, solid, powdery gelling proteinaceous substance is very easily dispersible in water without the aid of alkali. It makes a particularly advantageous remoistening adhesive for uses, such as pregummed paper, fabric, and the like. It has desirable slip characteristics which are advantageous in the use of pregummed wallpaper or sealing ribbons. In addition to its remoistening properties, the adhesive is also heat energizable. Seals made with it may be subjected to temperatures within the range of 150° to 250° F., while moist, to form a strong and permanent waterproof bond. This latter property is due to the formation of the irreversible gel in the bond which is subsequently incapable of being destroyed by steaming or remoistening.

The adhesive may be used in its original moistened state, that is, as the aqueous suspension, or the coated paper may be subsequently dried at room temperature or slightly above to form an adhesive coating upon the object treated. This dried coating is non-tacky and may be used advantageously where pregummed articles are to be rolled or stacked. The pregummed coating is not hygroscopic or sensitive to ordinary atmospheric conditions of temperature or humidity.

The ease with which the adhesive substance may be dispersed in water is a distinct advantage over previous proteinaceous adhesive compositions, since there is no tendency for the material to lump or form a mushy or gruel-like mixture with water. It forms a homogeneous and smooth suspension containing as much as 70 percent solids without the use of alkali. Of course, suspensions containing lesser concentrations of the substance may be used as desired. We prefer to use suspensions of about 15 to 50 percent solids as the coating composition, but good results may be obtained using suspensions anywhere within the range of 10 to 70 percent solids.

The following examples illustrate the invention but are not to be considered limiting.

Example I

The spray-dried solid material obtained from the extraction of soybean flakes with alcohol to remove all alcohol solubles was mixed with water in the cold to form an aqueous suspension containing 40 percent solids. The dispersion was light in color and had a consistency of mucilage. A one-half inch wide coating was brushed on at the two adjacent edges of a low quality writing paper square. The coating was allowed to dry under atmospheric conditions. The coating was subsequently remoistened, the paper folded diagonally, and the adhesive coating was pressed with the fingers against the opposite uncoated surface, much in the manner of sealing a common envelope. After ten seconds the bond was tested by attempting to tear open the seal. The seal held tenaciously although still slightly moist, and the paper itself ruptured all along the bond.

In a similar manner, any fairly smooth dry surface may be coated and subsequently bonded to any other smooth dry surface. The strength of the suspension may vary in accordance with the thickness of coating desired. For example, a 10 percent suspension will give a thin transparent coating for use on relatively non-porous surfaces, whereas a 40 percent or more suspension will give a thicker coating for use with relatively porous or uneven surfaces.

Example II

The water extract from hexane soybean flakes that had been triply washed with alcohol was admixed with granulated cork and molded, while still moist, into a rod one inch in diameter. The water extract in this case was an aqueous suspension containing about 25 percent solids. The molded rod was heated in a steam bath at 212° F. for about one hour. The extract coating the cork granules gelled under these conditions to form an irreversible adhesive for the cork granules. Disks were cut from the rod and tested as crown seals. The seal developed no leak and was found to be equal and, in some respects, slightly superior to crown seals made in the usual fashion, such as using egg albumen or hardened glue. In an additional test, disks made in this fashion withstand a three-hour boiling test without apparent injury to the adhesive material, whereas the usual commercial disks disintegrate in about 40 minutes.

Disks cut from the rod were also treated with a solution of formaldehyde for about 30 minutes and heated to drive off excess formaldehyde. Disks given this treatment showed increased toughness and water resistance.

Example III

Test pieces of kraft paper were coated with a 50 percent water suspension of the spray-dried solids obtained as described above. After drying at room temperature, the test pieces were placed with their remoistened coated surfaces in contact and subjected to temperatures of about 175° F. and a few pounds pressure. The bond formed immediately and when torn apart proved stronger than the paper itself.

Example IV

Test pieces of kraft paper were coated on both sides with a 50 percent aqueous suspension of the water extract. The pieces (while still moist) were stacked one upon the other and subjected to temperature of about 175° F. and hand pressure. The resulting laminated product was soaked in water for 60 hours. The bond between laminations held after this treatment, the paper itself rupturing when torn apart.

To achieve the waterproof permanent adhesive bond, the adhesive coating composition may be utilized either in the original wet or in the remoistened condition. For example, paper may be coated with the suspension and allowed to dry. The coated dried paper may then be stored until use and then remoistened before subjecting to gellation temperatures. Alternatively, the objects to be bonded may be coated immediately before the bonding operation, and bonded in the moist condition by the application of heat and sufficient pressure to insure contact.

The dry adhesive coatings of this invention are smooth and non-tacky. When used as remoistening bonds, they are not pressure sensitive when dry, and objects coated therewith may be piled or stacked under ordinary conditions without premature sticking. The coating may be used for any purpose in which an adhesive surface may be moistened and subsequently pressed against a similar coated or an uncoated surface.

Having thus described the invention, what is claimed is:

A solid material having as a bonding agent therefor a coating comprising essentially the water-extractable component of alcohol-extracted proteinaceous soybean residue, said component containing water-soluble constituents comprising proteins, carbohydrates, albumins, and proteoses.

ARTHUR C. BECKEL.
PAUL A. BELTER.

References Cited in the file of this patent

UNITED STATES PATENTS

| Number | Name | Date |
|---|---|---|
| 1,245,981 | Satow | Nov. 6, 1917 |
| 1,275,308 | Satow | Aug. 13, 1918 |
| 1,541,006 | Thevenot | June 9, 1925 |
| 1,766,302 | Muir | June 24, 1930 |
| 2,046,492 | Snyder | July 7, 1936 |
| 2,194,867 | Olcott | Mar. 26, 1940 |
| 2,495,706 | De Voss et al. | Jan. 31, 1950 |

FOREIGN PATENTS

| Number | Country | Date |
|---|---|---|
| 539,579 | Great Britain | Sept. 17, 1941 |

OTHER REFERENCES

Belter et al., Ind. and Eng. Chem., vol. 36, pp. 799–803, September 1944.